US006629657B2

United States Patent
Cripps et al.

(10) Patent No.: US 6,629,657 B2
(45) Date of Patent: Oct. 7, 2003

(54) METHOD AND APPARATUS TO WIND A TAPE AROUND A ROTATABLE REEL

(75) Inventors: Justin Ryan Cripps, Tucson, AZ (US); Ernest Stewart Gale, Tucson, AZ (US); Robert Allen Hutchins, Tucson, AZ (US); James Mitchell Karp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/816,950

(22) Filed: Mar. 22, 2001

(65) Prior Publication Data

US 2002/0134874 A1 Sep. 26, 2002

(51) Int. Cl.$^7$ ............................................. G11B 23/107
(52) U.S. Cl. ........................ 242/348.2; 242/160.1; 242/324; 242/520; 242/548.2; 360/132
(58) Field of Search ....................... 242/160.1, 341, 242/324, 348.2, 548.2, 548.3, 548.4, 348, 520; 360/132

(56) References Cited

U.S. PATENT DOCUMENTS

| 3,677,495 A | 7/1972 | Villers et al. ............... 242/197 |
| 3,744,736 A | 7/1973 | Kruhn ......................... 242/195 |
| 3,836,096 A | 9/1974 | Fukushima et al. ......... 242/197 |
| 3,856,228 A | 12/1974 | Hosono et al. ............. 242/71.8 |
| 3,955,777 A | 5/1976 | Burdorf ....................... 242/192 |
| 4,042,189 A | 8/1977 | Lewis ......................... 242/195 |
| 4,072,280 A | 2/1978 | Lewis ......................... 242/195 |
| 5,261,621 A | 11/1993 | Sakaguchi et al. ..... 242/67.1 R |
| 5,734,540 A | 3/1998 | Jacobs et al. ............... 360/132 |

Primary Examiner—John Q. Nguyen
(74) Attorney, Agent, or Firm—Dale F. Regelman (57) ABSTRACT

A method and apparatus to dispose a tape around the hub portion of a rotatable reel disposed within a tape cartridge, said hub including a pair of flanges extending outwardly therefrom and arranged to contain said tape, each of said flanges having an inner surface, said tape disposed on said hub such that a first edge of a first portion of said tape is disposed on the inner surface of a first flange and such that neither of the edges of a second portion of the tape are disposed on the inner surface of that first flange. A tape cartridge comprising a length of tape and rotatable reel disposed therein, said rotatable reel including a hub, and said hub including a pair of flanges extending outwardly therefrom and arranged to contain said tape, each of said flanges having an inner surface, said tape disposed on said hub such that a first edge of a first portion of said tape is disposed on the inner surface of a first flange and such that neither of the edges of a second portion of the tape are disposed on the inner surface of that first flange.

4 Claims, 8 Drawing Sheets

METHOD AND APPARATUS TO WIND A TAPE AROUND A ROTATABLE REEL

FIELD OF THE INVENTION

This invention relates to the field of winding a tape within a tape storage cartridge which includes a rotatably mounted reel. In particular, the invention relates to method and apparatus to wind a tape medium on a reel disposed within a tape storage cartridge. Applicants' invention further relates to a tape cartridge having a tape medium disposed therein.

BACKGROUND OF THE INVENTION

Tape media, such a magnetic tape, is a common medium for the storage of data to be utilized by a computer. Magnetic tape has found widespread use as a data storage medium because it provides a relatively inexpensive solution for storing large amounts of data. There are, however, some problems with the methods previously used to store magnetic tape that can cause damage to the magnetic tape media. This damage results in errors when reading or recording data on the magnetic tape.

Magnetic tape is stored on cartridges of which there are a variety of different types and sizes. One reason for the variety of cartridge types is the variety of different tape drives in which the cartridges are used. Tape cartridges are comprised essentially of a cartridge shell which houses a rotatably mounted reel. Magnetic tape is wound around the hub of the reel. Reel flanges are used to contain the magnetic tape as the magnetic tape is wound on the hub. A fully loaded tape cartridge has magnetic tape wound around the hub such that the multiple layers of tape form a stack of magnetic tape extending out to near the end of the reel flanges.

The tape cartridge is inserted into a tape drive mechanism which automatically threads the magnetic tape from the tape cartridge through the tape guide mechanism of the tape drive assembly. The tape is then available to the tape drive mechanism for the reading and writing of data.

Data is recorded on magnetic tape in a specific format. The ability of a tape drive mechanism to read data from a piece of magnetic tape is contingent upon the data existing on the tape at positions according to the specific recording format. If a read head is aligned with a segment of magnetic tape in order to read a certain data track but instead a different data track is adjacent the read head, errors in reading the data occur.

One way to ensure that the magnetic tape medium is properly aligned with the read/write heads of the tape drive mechanism is to use the edge of the magnetic tape medium as a reference position. If, for example, a tape cartridge is loaded with ½" magnetic tape, a tape edge guide mechanism in the tape drive is used whereby one edge of the magnetic tape is kept flush against the tape edge guide. If the width of the tape is constant, ½" in this example, then each track on the magnetic tape is in a known location, according to the recording format of the tape, relative to the read and write heads of the tape drive.

If the edge of a segment of magnetic tape is not straight, the tape edge guide mechanism is not able to properly align the magnetic tape. This can occur when the magnetic tape has been somehow damaged causing a crease, wrinkle, or other deformity, in the edge of the tape. When the damaged portion of the magnetic tape moves along the tape guide, the position of the magnetic tape with respect to the read and write heads is incorrect and, to some extent, unknown.

Errors can then result when reading data from the tape. Typical tape drive devices include a control unit programmed in such a way, through error correction routines, to detect when errors of this type occur. However, even if the error is detectable, there may be no way to read certain data from a damaged tape. These errors are sometimes called permanent errors and can be critical depending on the extent and type of data that is lost.

It is therefore important that tape loaded in a tape cartridge remain undamaged. Tape cartridges are subject to various forms of physical stress and shock. Magnetic tape is often used for long term storage of data for periods of many years therefore the cartridge must protect the tape not just when the cartridge is new but also after many years of physical handling.

Magnetic tape stored in tape cartridges using prior art winding methods and apparatus is susceptible to damage when the tape cartridge suffers a physical shock, such as when it is dropped. As described above, magnetic tape is wound on the hub of a reel. The reels have flanges extending from the hub which are flared slightly so that the distance between the flanges is greater at the outer edge of the flanges than the distance between the flanges immediately adjacent the hub. This is because allowance must be made for air to escape from between the layers of tape as the tape is wound on the hub.

It is also necessary to provide an amount of clearance between the reel and the cartridge shell so that the reel can move, to a limited extent, independent of the position of the shell. This clearance is required to allow the reel to be engaged by the motor drive of the tape drive mechanism when the cartridge is inserted into the tape drive mechanism.

Sometimes when the tape is winding on the hub using prior winding methods and apparatus, a layer of tape is inadvertently wound offset from the rest of the stack of tape wound on the hub. This results in what is termed a "pop strand" or "stagger wrap fin" which is a single layer, or a grouping of layers, which are not edge for edge aligned with the remainder of the tape wound on the hub. The stagger wrap fin extends into the space between the edge of the stack of tape and the adjacent flange. If the cartridge is dropped on the floor and lands on a corner of the cartridge, the shock of the impact can force the outer edge of the reel flange to contact the cartridge shell. This causes the outer edge of the reel flange to flex inwardly in the direction of the other reel flange, thereby reducing the distance between those reel flanges. In this event, a stagger wrap fin can be pinched between the reel flange and the stack of tape. When a stagger wrap fin gets pinched between the reel flange and the stack of tape, a crease is formed in the tape comprising the stagger wrap fin. Creases in the tape edges destroy the straight, consistent tape edge necessary for error-free operation of the tape drive mechanism.

If the edge of the tape is damaged, then the tape does not thread properly in the tape drive mechanism. When the damaged tape edge passes along the tape edge guide mechanism, the tape is improperly aligned relative to the read and write heads of the tape drive device. This results in errors when reading data from the tape or writing data to the tape. These errors may be, as described above, permanent errors which cannot be corrected through error correction codes. Permanent errors can be catastrophic depending on the criticality of the data that is lost.

There exists a need for a method and apparatus to dispose a tape within a tape cartridge such that the tape is better protected from mechanical forces impacting upon the cartridge. Applicants' method and apparatus achieves these goals using conventional tape cartridge components.

SUMMARY OF THE INVENTION

Applicants' invention includes a method for disposing a length of tape around the hub portion of a rotatable reel housed with a tape cartridge. The reel includes a first flange having an inner surface, and a second flange having an inner surface. These flanges connect to the hub and extend outwardly therefrom to contain the wound tape. Applicants' method includes the steps of attaching the first end of the tape to the hub portion, rotating the reel to dispose a first portion of the tape around the hub. This first portion of the tape includes a first edge and a second edge. This first portion is would around the hub such that its first edge is disposed on the inner surface of the first flange.

Applicants' method further includes the step of disposing a second portion of the tape around the hub. This second portion includes a first edge and a second edge. This second portion is wound around the hub such that its first edge is separated from the inner surface of the first flange by a gap.

Applicants' invention further comprises a winding apparatus which includes a computer useable medium having computer readable program code disposed therein for winding a length of a tape medium around the hub portion of a rotatable reel. This tape medium has a width separating a first edge from a second edge. The tape also includes a first end and a second end. The reel is formed as described above.

The computer readable program code includes a series of computer readable program steps to cause the reel to rotate, thereby winding the tape around the hub portion of the reel by disposing a first portion of the tape around the hub such that the first edge of that first portion is disposed against said inner surface of the first flange. The computer readable program further includes a series of computer readable program steps to dispose a second portion of the tape around the hub such that the first edge of that second portion is separated by a gap from the inner surface of said first flange.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
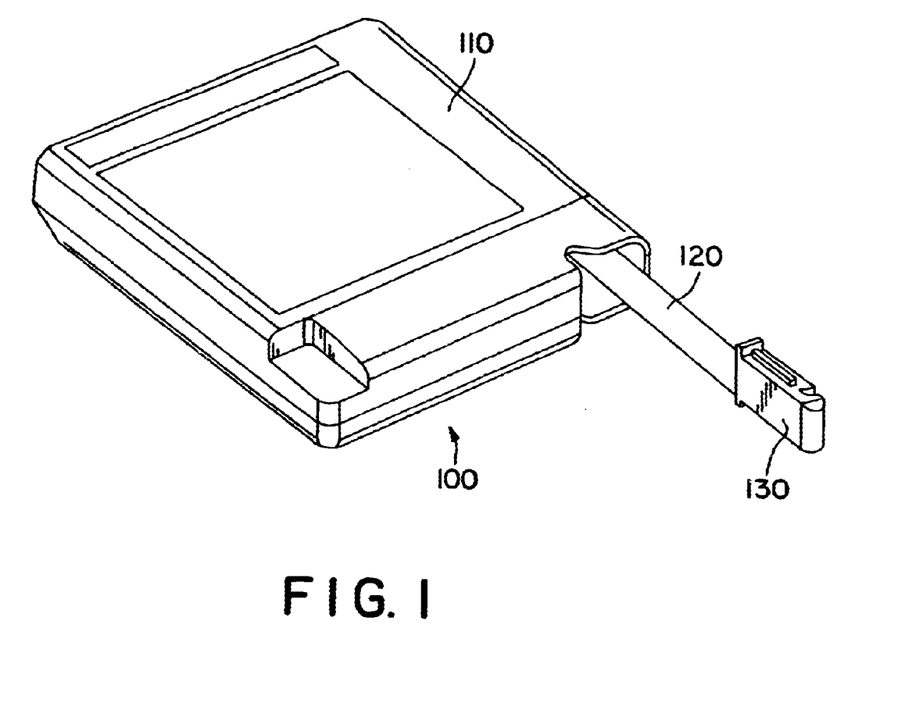
FIG. 1 shows a complete tape cartridge.

FIG. 1 depicts tape cartridge 100. Tape cartridge 100 comprises cartridge shell 110 which encases a reel (not shown in FIG. 1) around which is wound magnetic tape 120. Leader block 130 is attached to the end of the length of magnetic tape 120 contained inside shell 110 and is formed to cooperate with the tape drive mechanism (not shown) to allow the automatic threading of magnetic tape 120 in the tape drive mechanism. Leader block 130 and attached magnetic tape 120 are shown slightly extended from shell 110 in FIG. 1. There are various features not shown on shell 110, such as locating notches, write-inhibiting switches, and the like, which are not relevant to the present invention. It is apparent to those skilled in the art that tape cartridge 100 is only exemplary and the present invention is applicable to any configuration of tape cartridge 100.

Figure 2:
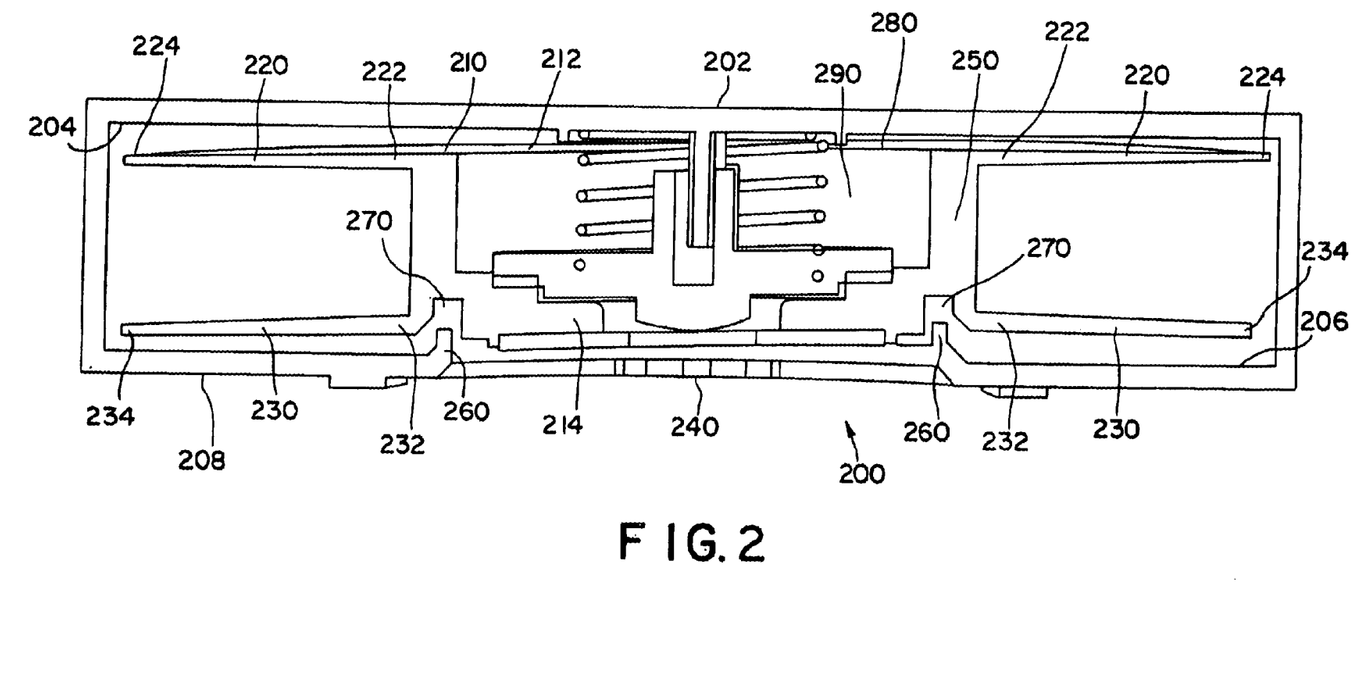
FIG. 2 shows a cutaway view of a reel within a tape cartridge.

FIG. 2 shows a schematic representation of a cut-away view of tape cartridge 200. Reel 210 is contained within shell 202 and, when engaged by a drive motor mechanism (not shown) of the tape drive mechanism as described below, spins within shell 202 in response to the operation of the drive motor. Reel 210 comprises top portion 212 and bottom portion 214.

Reel 210 includes annular-shaped hub 250 and flanges 220 and 230. Flanges 220 and 230 connect to, and extend radially outward from, hub 250 forming a channel between them in which tape (not shown in FIG. 2) is contained as that tape is wound around hub 250. Flange 220 is disposed on top portion 212 of reel 210. Flange 220 includes proximal end 222 disposed at the connection point between flange 220 and hub 250, and distal end 224 disposed outwardly from hub 250. Flange 230 is disposed on bottom portion 214 of reel 210. Flange 230 includes proximal end 232 disposed at the connection point between flange 230 and hub 250, and distal end 234 disposed outwardly from hub 250.

In operation, a drive motor mechanism extends through drive motor port 240 in shell 202 and engages reel 210 through hub 250. In response to signals from a tape drive controller, the drive motor mechanism rotates reel 250. The operation of the drive motor mechanism is coordinated with the remainder of the tape drive mechanism to draw tape 120 (FIG. 1) from tape cartridge 200 for use in the tape drive mechanism to, for example, read and/or write data thereon. There must be a certain amount of clearance between reel 250 and shell 202. This is necessary to allow reel 250 to move slightly with respect to shell 202 to allow proper engagement between reel 250 and the drive motor mechanism.

Annular member 260 is disposed on interior surface 206 of bottom portion 208 of shell 202. Reel 210 includes annular groove 270 disposed on bottom portion 214. As shown in FIG. 2 annular member 260 extends into annular groove 270 thereby providing a dust seal. Aperture 280 extends through top portion 212 of reel 210. Aperture 280 is symmetrically disposed around the center of reel 210. Wall 290 of aperture 280 is cylindrical in shape.

Figure 3:
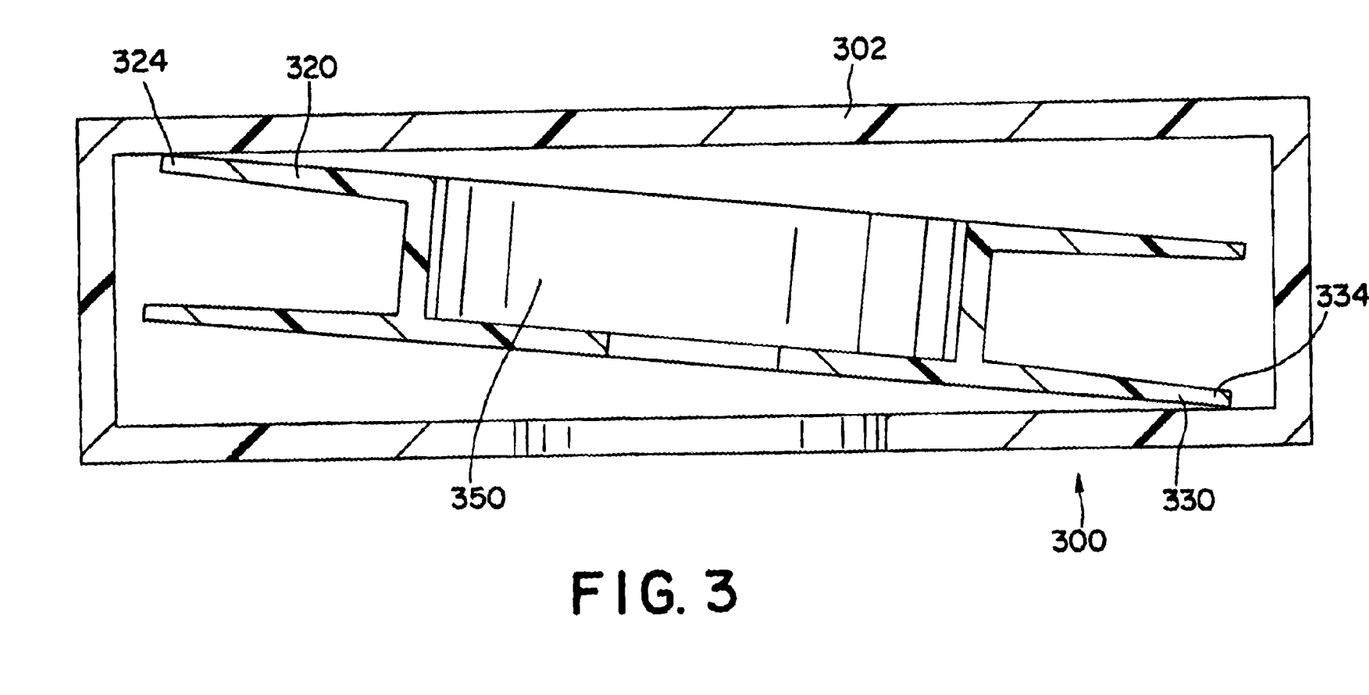
FIG. 3 shows a cutaway view of a reel within a tape cartridge.

In FIG. 3, reel 350 is depicted at an angle within shell 302. This illustrates the degree of movement of the reel 350 within shell 302 possible many in many prior art tape cartridges. As shown in FIG. 3, distal end 324 of flange 320 contacts the top side inner surface of shell 302, while distal end 334 of flange 330 contacts the bottom side inner surface of shell 302. Such contact between flanges 320 and 330 and shell 302 is disadvantageous for the reasons discussed above.

Such disadvantageous contact between flanges 320 and 330 and the cartridge shell 302 can occur when the tape cartridge is in operation within a drive device, and when the tape cartridge is external to such a tape drive device. For example, if tape cartridge 300 is dropped, the resulting contact with the floor subjects the cartridge, and its contents, to a mechanical force. That impact force can cause reel 350 to cant as shown in FIG. 3, such that the distal ends 324 and 334 of flanges 320 and 330, respectively, contact cartridge shell 302. In this canted configuration, the mechanical force is transferred to the distal ends 324 and 334. This force causes the distal ends 324 and 334 to flex inwardly thereby decreasing the distance between the distal ends of flanges 320 and 330. Such inward flexing of the distal ends of flanges 320 and 330 can cause damage to the tape would around reel 350 if that tape has been wound using prior art methods and apparatus.

Figure 4:
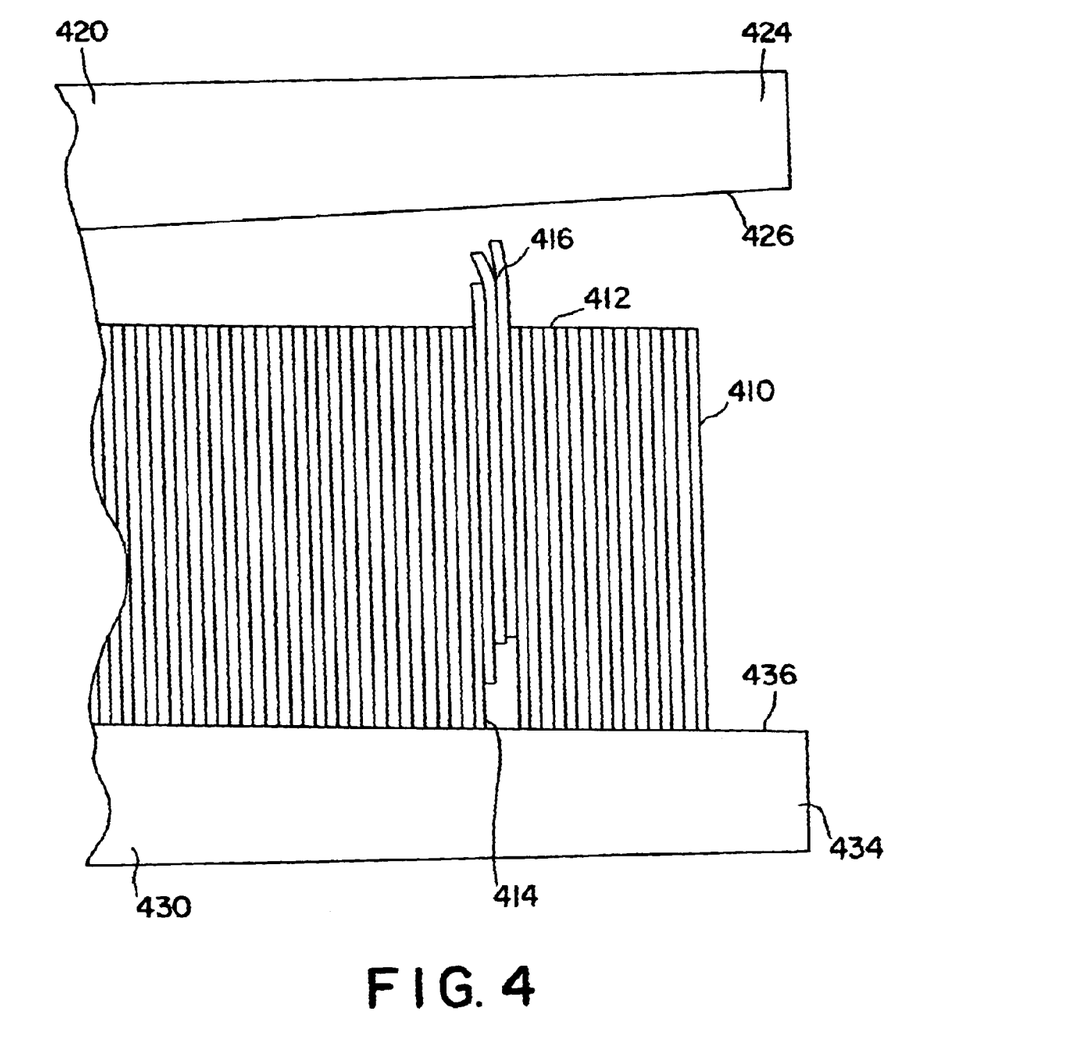
FIG. 4 shows a partial cutaway view of magnetic tape held within the reel flanges of a tape cartridge.

FIG. 4 is a more detailed section view of distal ends 424 and 434 of flanges 420 and 430, respectively, showing a section through the windings of tape 410 wound around reel 210 (FIG. 2) using a prior art winding method. Tape 410 comprises a first edge 412 and an opposed second edge 414. The distance between flanges 420 and 430 is smallest at their proximal ends disposed adjacent hub 250 (FIG. 2). Inner surface 426 of flange 420 and inner surface 436 of flange 430 are angled such that the distance between flange 420 and flange 430 increases with radial distance from hub 250. This is necessary to allow air to escape from between the layers of tape 410 as tape 410 is wound around hub 250 at a high rate of revolutions per second.

When tape 410 is wound on reel 210 (FIG. 2) using prior art methods, tape 410 stacks flush along one of flanges. As shown in FIG. 4, tape 410 is, for the most part, wound such that edge 414 remains flush with inner surface 436 of flange 430, leaving a space between edge 412 and inner surface 426 of distal end 424. At distal ends 424 and 434, the clearance between tape 410 and flange 420 is maximized.

In prior art winding methods, tape 410 winds around hub 210 such that the edges 412 and 414 in each winding are aligned with the edges of tape 410 in the other windings. Occasionally, however, a winding of tape 410, or a group of windings of tape 410, extend beyond the rest of the stack of tape 410 wound on hub 210 (FIG. 2). This occurrence is represented in FIG. 4 by stagger wrap fin 416. Stagger wrap fin 416 is comprised of several windings of tape 410 which are not aligned with the rest of the windings of tape 410.

In the event a mechanical force causes inward flexing of distal ends 424 and 434, inner surface 426 could strike stagger wrap fin 416. Such contact between inner surface 426 and stagger wrap fin 416 can form a crease in tape 410. Such a crease can cause problems reading data from, or writing data to, tape 410.

Figure 5:
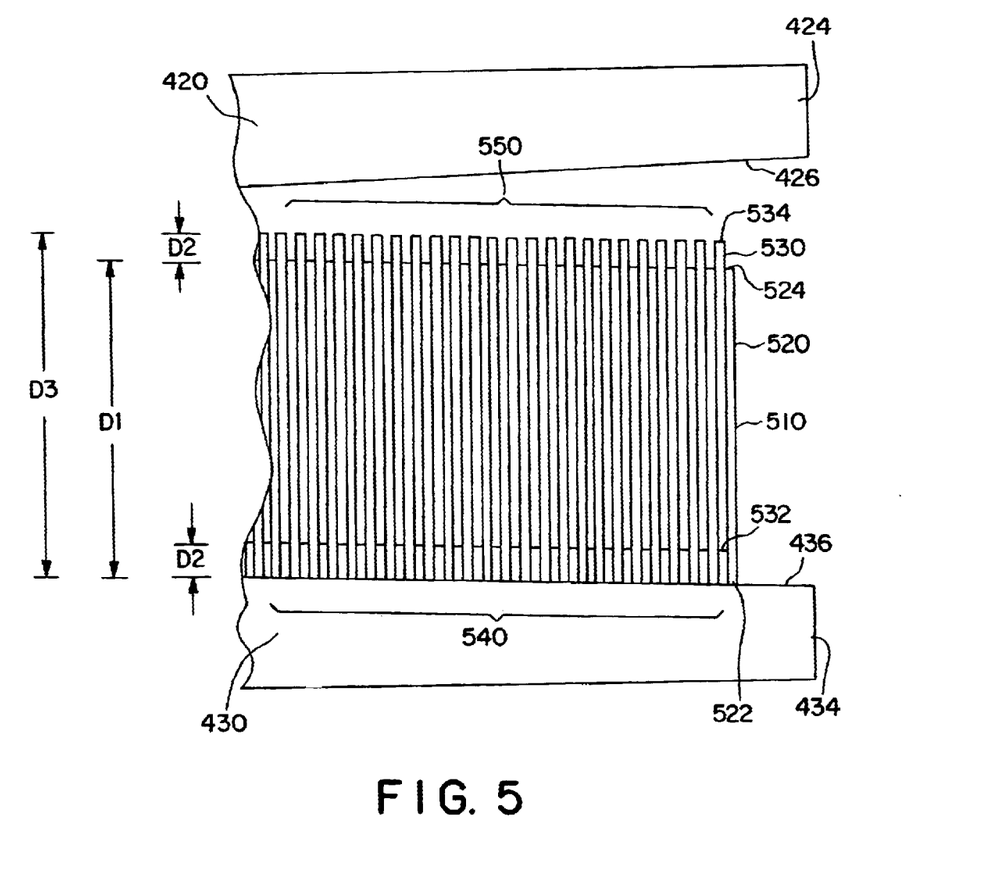
FIG. 5 shows a partial cutaway view of magnetic tape held within the reel flanges of a tape cartridge in accord with a first embodiment of Applicants' method, winding apparatus, and tape cartridge.

FIG. 5 shows a partial cutaway view of tape 510 disposed on reel 210 (FIG. 2) between 20 flange 420 and flange 430 in accord with a first embodiment of Applicants' method, winding apparatus, and tape cartridge. Tape 510 is disposed on reel by interleaving components of first portion 520 of tape 510 and components of second portion 530 of tape 510. First portion 520 comprises a plurality of components 540. Each of the plurality of components 540 includes a first edge 522 and a second edge 524. As shown in FIG. 5, first edge 522 of first portion 520 of tape 510 is disposed flush with inner surface 436 of flange 430. Second edge 524 of first portion 520 of tape 510 is disposed about a distance D1 from inner surface 436.

Second portion 530 of tape 510 comprises a plurality of components 550. Each of the plurality of components 550 includes a first edge 532 and a second edge 534. As shown in FIG. 5, first edge 532 of second portion 530 of tape 510 is separated by a distance D2 from inner surface 436 of flange 430. The distance D2 is up to about 0.25 times the width of tape 510.

Second edge 534 of second portion 530 of tape 510 is disposed a distance D3 from inner surface 436. Because first edge 532 of second portion 530 is offset by distance of D2 from first edge 522 of first portion 520, second edge 534 of second portion 530 is also offset from second edge 524 of second portion 530 by distance D2. Therefore, distance D1 is less than distance D3.

In the embodiment shown in FIG. 5, the plurality of components forming first portion 520 each comprise one winding of tape 510. Similarly, in the embodiment shown in FIG. 5, the plurality of components forming second portion 530 each comprise one winding of tape 510. In the event a stagger wrap fin, such as stagger warp fin 416, occurs in first portion 520 of tape 510, that stagger wrap fin is protected by second portion 530.

Referring again to FIG. 4, if a mechanical force causes distal end 424 and/or distal end 434 to flex inwardly such that inner surface 426 if inner surface 426 strikes stagger wrap fin 416, then the total energy of that force is imparted to stagger wrap fin 416. The impact of such a force is likely to damage the tape comprising stagger wrap fin 416. Data residing in that damaged portion is likely irretrievably lost.

In marked contrast, however, if a mechanical force causes distal end 424 and/or distal end 434 to flex inwardly such that inner surface 426 strikes second edge 534 of second portion 530 of tape 510, then that mechanical force is dissipated along the entire length of second edge 534. A stagger wrap fin disposed in first portion 520 is effectively protected from such a mechanical force by the entirety of second portion 530.

In a related embodiment not shown in FIG. 5, second edge 534 of second portion 530 is disposed on inner surface 426 of flange 420. In this embodiment, distances D2 and D3 are greater than shown in FIG. 5. In this embodiment, a stagger wrap fin disposed on second edge 524 of first portion 520 is protected by second portion 530. In addition, a stagger wrap fin disposed on first edge 532 of second portion 530 is protected by first portion 520.

Figure 6:
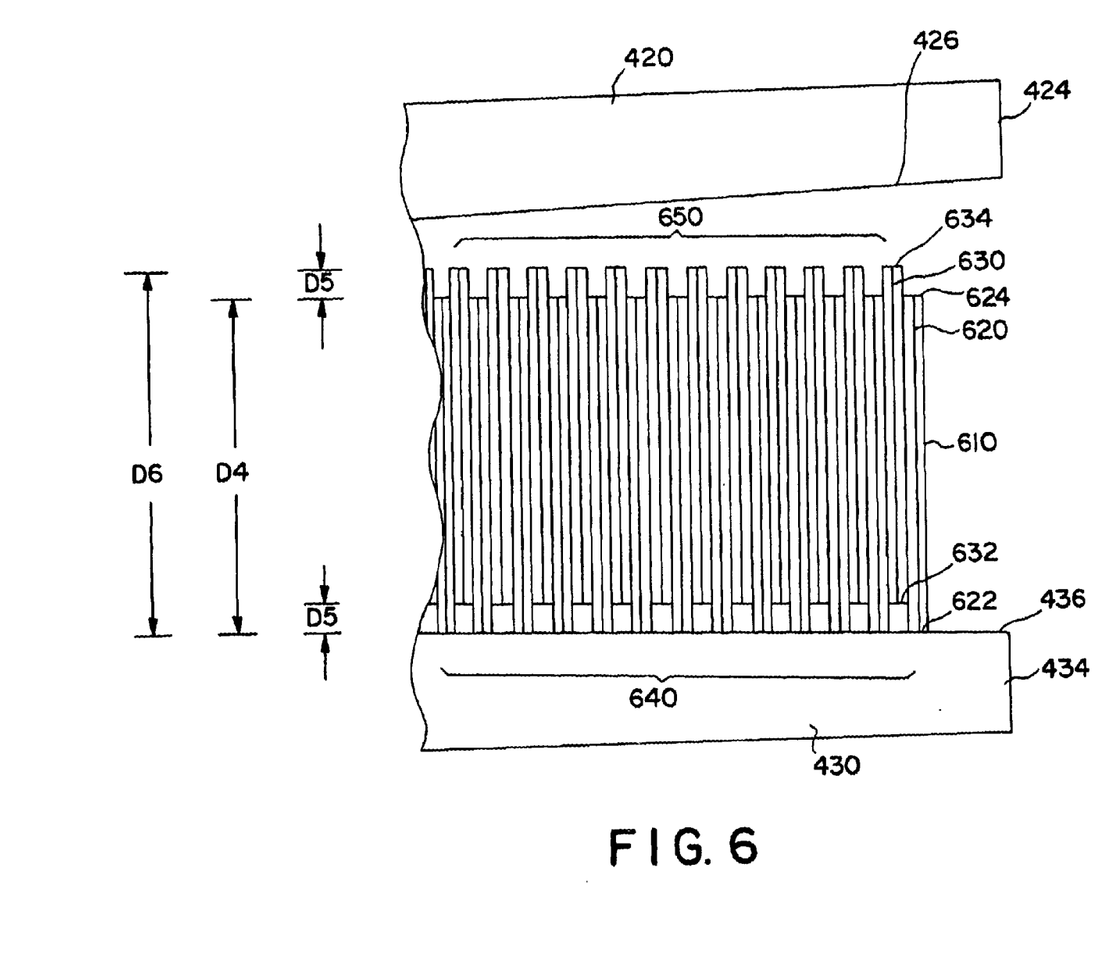
FIG. 6 shows a partial cutaway view of magnetic tape held within the reel flanges of a tape cartridge in accord with a second embodiment of Applicants' method, winding apparatus, and tape cartridge.

FIG. 6 shows a partial cutaway view of tape 610 disposed on reel 210 (FIG. 2) between flange 420 and flange 430 in accord with a second embodiment of Applicants' method, winding apparatus, and tape cartridge. Tape 610 is disposed on reel by interleaving components of first portion 620 of tape 610 and components of second portion 630 of tape 610. First portion 620 comprises a plurality of components 640. Each of the plurality of components 640 includes a first edge 622 and a second edge 624. As shown in FIG. 6, first edge 622 of first portion 620 of tape 610 is disposed flush with inner surface 436 of flange 430. Second edge 624 of first portion 620 of tape 610 is disposed about a distance D4 from inner surface 436.

Second portion 630 of tape 610 comprises a plurality of components 650. Each of the plurality of components 650 includes a first edge 632 and a second edge 634. As shown in FIG. 6, first edge 632 of second portion 630 of tape 510 is separated by a distance D5 from inner surface 436 of flange 430. The distance D5 is up to about 0.25 times the width of tape 610.

Second edge 634 of second portion 630 of tape 610 is disposed a distance D6 from inner surface 436. Because first edge 632 of second portion 630 is offset by distance of D5 from first edge 622 of first portion 620, second edge 634 of second portion 630 is also offset from second edge 624 of second portion 630 by distance D5. Therefore, distance D4 is less than distance D6.

In the embodiment shown in FIG. 6, each of plurality of components 640 which form first portion 620 comprises two windings of tape 610. Similarly in the embodiment shown in FIG. 6, each of plurality of components 650 which form second portion 630 comprises two windings of tape 610. In the event a stagger wrap fin, such as stagger warp fin 416 (FIG. 4), occurs in first portion 620 of tape 610, that stagger wrap fin is protected by second portion 630.

In a related embodiment not shown in FIG. 6, second edge 634 of second portion 630 is disposed on inner surface 426 of flange 420. In this embodiment, distances D5 and D6 are greater than shown in FIG. 6. In this embodiment, a stagger wrap fin disposed on second edge 624 of first portion 620 is protected by second portion 630. In addition, a stagger wrap fin disposed on first edge 632 of second portion 630 is protected by first portion 620.

Figure 7:
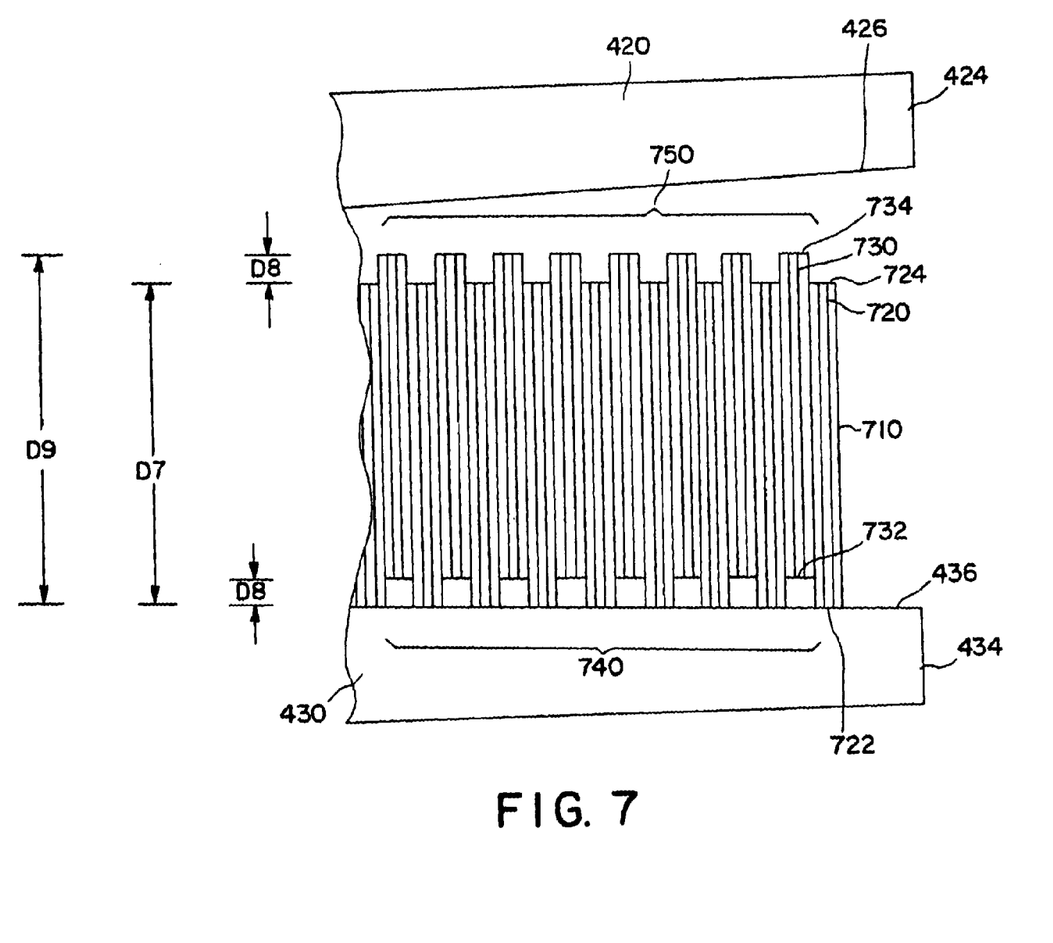
FIG. 7 shows a partial cutaway view of magnetic tape held within the reel flanges of a tape cartridge in accord with a third embodiment of Applicants' method, winding apparatus, and tape cartridge.

FIG. 7 shows a partial cutaway view of tape 710 disposed on reel 210 (FIG. 2) between flange 420 and flange 430 in accord with a third embodiment of Applicants' method, winding apparatus, and tape cartridge. Tape 710 is disposed on reel 210 (FIG. 2) by interleaving components of first portion 720 of tape 710 and components of second portion 730 of tape 710. First portion 720 comprises a plurality of components 740. Each of the plurality of components 740 includes a first edge 722 and a second edge 724. As shown in FIG. 7, first edge 722 of first portion 720 of tape 710 is disposed flush with inner surface 736 of flange 730. Second edge 724 of first portion 720 of tape 710 is disposed about a distance D7 from inner surface 436.

Second portion 730 of tape 710 comprises a plurality of components 750. Each of the plurality of components 750 includes a first edge 732 and a second edge 734. As shown in FIG. 7, first edge 732 of second portion 730 of tape 710 is separated by a distance D8 from inner surface 436 of flange 430. The distance D8 is up to about 0.25 times the width of tape 710.

Second edge 734 of second portion 730 of tape 710 is disposed a distance D9 from inner surface 436. Because first edge 732 of second portion 730 is offset by distance of D8 from first edge 722 of first portion 720, second edge 734 of second portion 730 is also offset from second edge 724 of second portion 730 by distance D8. Distance D7 is less than distance D9.

In the embodiment shown in FIG. 7, each of plurality of first components 740 which form first portion 720 comprises three windings of tape 610. Similarly in the embodiment shown in FIG. 7, each of plurality of second components 750 which form second portion 630 comprises three windings of tape 610. In the event a stagger wrap fin, such as stagger warp fin 416 (FIG. 4), occurs in first portion 720 of tape 610, that stagger wrap fin is protected by second portion 730.

In a related embodiment not shown in FIG. 7, second edge 734 of second portion 730 is disposed on inner surface 426 of flange 420. In this embodiment, distances D8 and D9 are greater than shown in FIG. 7. In this embodiment, a stagger wrap fin disposed on second edge 724 of first portion 720 is protected by second portion 730. In addition, a stagger wrap fin disposed on first edge 732 of second portion 730 is protected by first portion 720.

Figure 8:
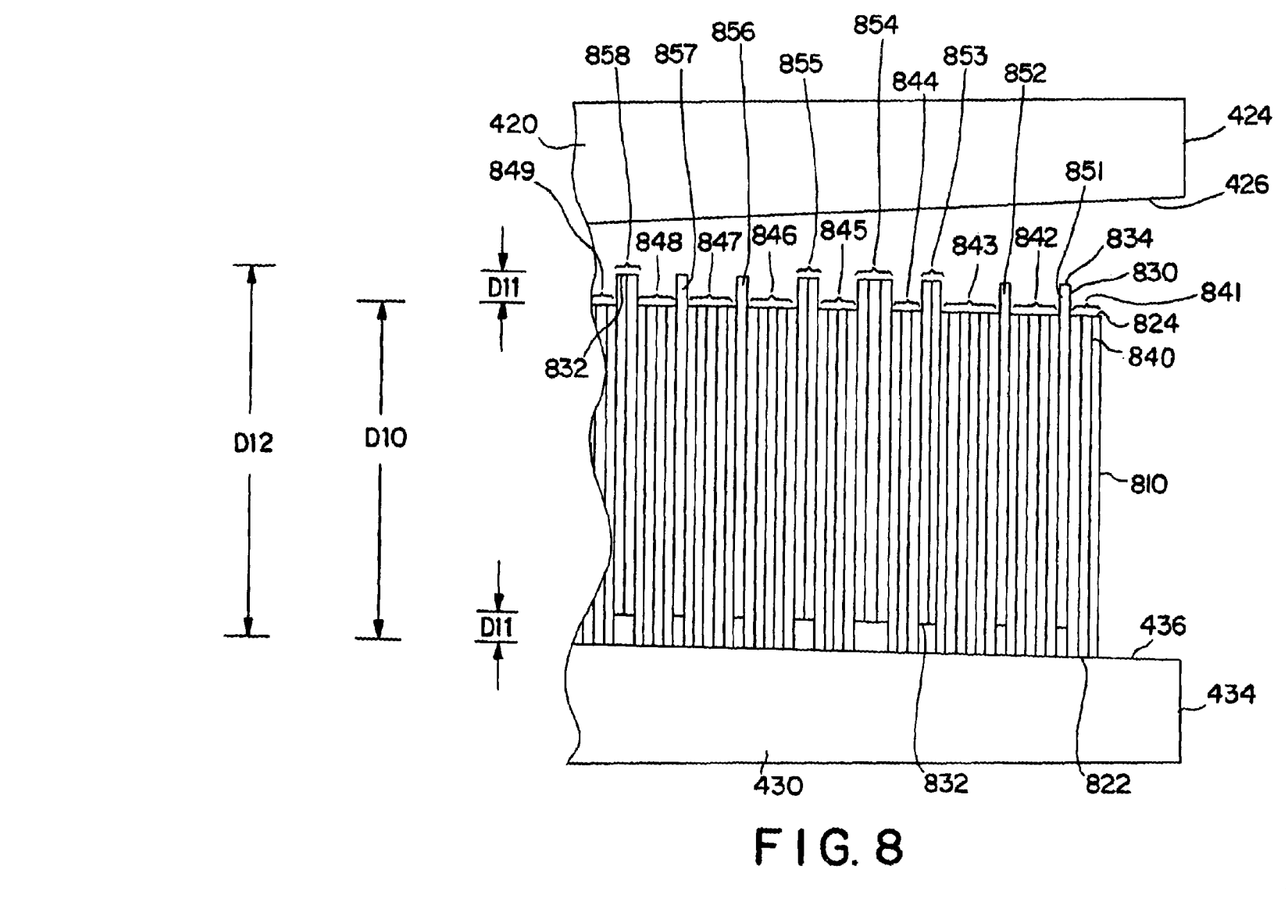
FIG. 8 shows a partial cutaway view of magnetic tape held within the reel flanges of a tape cartridge in accord with a fourth embodiment of Applicants' method, winding apparatus, and tape cartridge.

FIG. 8 shows a partial cutaway view of tape 810 disposed on reel 210 (FIG. 2) between flange 420 and flange 430 in accord with a fourth embodiment of Applicants' method, winding apparatus, and tape cartridge. Tape 810 is disposed on reel by interleaving components of first portion 820 of tape 810 with components of second portion 830 of tape 810.

First portion 820 comprises plurality of first components 840, including components 841, 842, 843, 844, 845, 846, 847, 848, and 849. As shown in FIG. 8, component 841 comprises three windings of tape 810. Component 842, comprises five windings of tape 810. Component 843 comprises six windings of tape 810. Component 844 comprises three windings of tape 810. Component 845 comprises four windings of tape 810. Component 846 comprises five windings of tape 810. Component 847 comprises five windings of tape 810. Component 848 comprises four windings of tape 810.

Second portion 830 comprises plurality of second component 850, including components 851, 852, 853, 854, 855, 856, 857, and 858. Component 851 comprises one winding of tape 810. Component 852 comprises one winding of tape 810. Component 853 comprises two windings of tape 810. Component 854 comprises three windings of tape 810. Component 855 comprises two windings of tape 810. Component 856 comprises one winding of tape 810. Component 857 comprises one winding of tape 810. Component 858 comprises two windings of tape 810.

Each of plurality of first components 840 comprising first portion 820 includes a first edge 822 and a second edge 824. As shown in FIG. 8, first edge 822 is disposed flush with inner surface 436 of flange 430. Second edge 824 is separated by a distance D10 from inner surface 436.

Each of plurality of second components 850 comprising second portion 830 of tape 810 includes a first edge 832 and a second edge 834. As shown in FIG. 8, first edge 832 of second portion 830 of tape 810 is separated from inner surface 436 of flange 430 by a gap having length D11 as shown in FIG. 8. The distance D11 is up to about 0.25 times the width of tape 810. Second edge 834 of second portion 830 of tape 810 is separated from inner surface 436 by a distance D12. Because first edge 832 of second portion 830 is offset by distance of D11 from first edge 822 of first portion 820, second edge 834 of second portion 830 is also offset from second edge 824 of second portion 830 by distance D11. Distance D10 is less than distance D12, and therefor, second edge 834 is disposed closer to inner surface 426 than is second edge 824. In the event a stagger wrap fin, such as stagger wrap fin 416 (FIG. 4), occurs in first portion 820 of tape 810, that stagger wrap fin is protected by second portion 830.

Each of plurality of first components 840 which comprise first portion 820 are selected from the group consisting of one winding of tape 810, two windings of tape 810, and a plurality of windings of tape 810. Each of plurality of second components 850 which comprise second portion 830 are selected from the group consisting of one winding of tape 810, two windings of tape 810, and a plurality of windings of tape 810.

Applicants' invention further comprises a winding apparatus which includes a computer useable medium having computer readable program code disposed therein for winding tape 120 (FIG. 1) around hub 250 (FIG. 2) of rotatable reel 210 (FIG. 2) in accord with the embodiments shown in FIGS. 5, 6, 7, and 8 as discussed above.

The computer readable program code includes a series of computer readable program steps to cause Applicants' apparatus to rotate reel 210 (FIG. 2), and thereby wind tape 120 (FIG. 1) around hub 250 (FIG. 2) of reel 210 (FIG. 2) by disposing first portion 520, 620, 720, 820 (FIGS. 5, 6, 7, 8), respectively, of tape 510, 610, 710, 810 (FIGS. 5, 6, 7, 8), respectively, around hub 250 (FIG. 2) such that first edge 522, 622, 722, 822 (FIGS. 5, 6, 7, 8), respectively, of that first portion is disposed against inner surface 436 (FIGS. 4, 5, 6, 7, 8), respectively, of second flange 430 (FIGS. 4, 5, 6, 7, 8). Applicants' computer readable program further includes a series of computer readable program steps to dispose second portion 530, 630, 730, 830 (FIGS. 5, 6, 7, 8), respectively, of tape 510, 610, 710, 810 (FIGS. 5, 6, 7, 8), respectively, around hub 250 (FIG. 2) such that first edge 532, 632, 732, 832 (FIGS. 5, 6, 7, 8), respectively, of that second portion is separated by a distance D2, D5, D8, and D11 (FIGS. 5, 6, 7, 8), respectively, from inner surface 434 of said flange 430.

Applicants' computer readable program further includes a series of computer readable program steps to interleave a plurality of first components 540, 640, 740, 840 (FIGS. 5, 6, 7, 8), respectively with a plurality of second components 550, 650, 750, 850 (FIGS. 5, 6, 7, 8), respectively.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method to dispose a length of tape around the hub portion of a rotatable reel, said reel comprising a first flange having an inner surface, and a second flange having an inner surface, said flanges connecting to said hub and extending outwardly therefrom to contain said tape, said method comprising the steps of:

provided a tape having a width, a first end, and a second end;

attaching said first end of said tape to said hub portion;

rotating said reel;

disposing a first portion of said tape around said hub, said first portion of said tape having a first edge and a second edge, wherein said first edge of said first portion is disposed on said inner surface of said first flange and said second edge of said first portion is separated from said inner surface of said first flange by a first distance; and disposing a second portion of said tape around said hub, said second portion of said tape having a first edge and a second edge, wherein said first edge of said second portion is separated from said inner surface of said first flange by a second distance, and wherein said second edge of said second portion is separated from said inner surface of said first flange by a third distance, such that said third distance is greater than said first distance.

wherein said first portion comprises a plurality of first components and wherein said second portion comprises a plurality of second components;

alternately disposing around said hub one of said plurality of first components and one of said plurality of second components until said second end of said tape is disposed on said reel.

2. The method of claim 1, wherein each of said plurality of first components is selected from the group consisting of one winding of said tape, two windings of said tape, and a plurality of windings of said tape.

3. The method of claim 1, wherein each of said plurality of second components is selected from the group consisting of one winding of said tape, two windings of said tape, and a plurality of windings of said tape.

4. The method of claim 1, wherein said second edge of said second portion is disposed on said inner surface of said second flange.

* * * * *